United States Patent
Wang et al.

(10) Patent No.: US 10,746,870 B2
(45) Date of Patent: Aug. 18, 2020

(54) METHOD AND DEVICE FOR NON-INTERRUPTED PHASE SYNCHRONIZATION SCHEME FOR BISTATIC SYNTHETIC APERTURE RADAR

(71) Applicant: Institute of Electronics, Chinese Academy of Sciences, Beijing (CN)

(72) Inventors: Yu Wang, Beijing (CN); Hangjian Li, Beijing (CN); Kaiyu Liu, Beijing (CN)

(73) Assignee: INSTITUTE OF ELECTRONICS, CHINESE ACADEMY OF SCI., Beijing (CN)

( * ) Notice: Subject to any disclaimer, the term of this patent is extended or adjusted under 35 U.S.C. 154(b) by 173 days.

(21) Appl. No.: 15/963,153

(22) Filed: Apr. 26, 2018

(65) Prior Publication Data

US 2018/0313951 A1  Nov. 1, 2018

(30) Foreign Application Priority Data

Apr. 27, 2017 (CN) .......................... 2017 1 0287459

(51) Int. Cl.
  *G01S 13/90* (2006.01)
  *G01S 1/36* (2006.01)
  *G01S 7/40* (2006.01)

(52) U.S. Cl.
  CPC .......... *G01S 13/9023* (2013.01); *G01S 1/36* (2013.01); *G01S 7/4021* (2013.01); *G01S 13/9058* (2019.05)

(58) Field of Classification Search
  None
  See application file for complete search history.

(56) References Cited

U.S. PATENT DOCUMENTS

| | | | | |
|---|---|---|---|---|
| 4,602,257 A | * | 7/1986 | Grisham | G01S 13/904 342/25 F |
| 7,209,072 B2 | * | 4/2007 | Braubach | G01S 13/003 342/59 |

(Continued)

FOREIGN PATENT DOCUMENTS

| | | |
|---|---|---|
| CN | 103323843 A | 9/2013 |
| CN | 106019278 A | 10/2016 |

(Continued)

OTHER PUBLICATIONS

Krieger, et al, TanDEM-X: A radar interferometer with two formation-flying satellites; Acta Astronomica 89 (2013) 83-98 (Year: 2013).*

(Continued)

*Primary Examiner* — Erin F Heard
*Assistant Examiner* — Donald H B Braswell
(74) *Attorney, Agent, or Firm* — Syncoda LLC; Feng Ma

(57) ABSTRACT

A phase synchronization method includes: pulse widths of first and second phase synchronization signals and starting time of transmission of first and second phase synchronization signals are determined, wherein starting time is located between two successive moments when radar signals are transmitted; first spaceborne SAR is controlled to transmit first phase synchronization signal to second spaceborne SAR according to pulse width and starting time of first phase synchronization signal; second spaceborne SAR is controlled, according to pulse width and starting time of second phase synchronization signal, to transmit second phase synchronization signal to first spaceborne SAR; compensation phase is determined according to peak phases of first and second phase synchronization signals received by second and first spaceborne SARs respectively; and phase synchronization compensation is performed, according to (Continued)

compensation phase, on radar signals received by first spaceborne SAR and second spaceborne SAR.

16 Claims, 8 Drawing Sheets

(56) References Cited

U.S. PATENT DOCUMENTS

| | | | | |
|---|---|---|---|---|
| 7,336,217 | B2* | 2/2008 | Voelker | G01S 7/40 |
| | | | | 342/174 |
| 8,296,051 | B2* | 10/2012 | Cohen | G01C 21/206 |
| | | | | 455/13.3 |
| 8,547,897 | B2* | 10/2013 | Chang | H04B 7/0413 |
| | | | | 370/316 |
| 2005/0083225 | A1 | 4/2005 | Braubach | |
| 2008/0165048 | A1* | 7/2008 | Shklarsky | G01S 13/003 |
| | | | | 342/59 |
| 2010/0265123 | A1* | 10/2010 | Lancashire | H01Q 3/36 |
| | | | | 342/175 |
| 2018/0284261 | A1* | 10/2018 | Oishi | G01S 7/04 |

FOREIGN PATENT DOCUMENTS

| | | |
|---|---|---|
| DE | 10256420 A1 | 6/2004 |
| DE | 10348621 A1 | 6/2005 |

OTHER PUBLICATIONS

Notice of Allowance of EP application No. 18169769.9, dated Aug. 6, 2019.

Wenqin Wang: "Approach of Adaptive Synchronization for Bistatic SAR Real-Time Imaging", IEEE Transaction S on Geoscience and Remote Sensing, IEEE Service Center, Piscataway, NJ, US, vol. 45, No. 9, Sep. 1, 2007 (Sep. 1, 2007), pp. 2695-2700, XP011191014, ISSN: 0196-2892, DOI:10.1109/TGRS. 2007.901058.

Feng Hong et al: "Integrated Time and Phase Synchronization Strategy for a Multichannel Spaceborne-Stationary Bistatic SAR System", REMOTE Sensing, vol. 8, No. 8, Jul. 29, 2016 (Jul. 29, 2016), p. 628, XP055506221, DOI: 10.3390/rs8080628.

Wen-Qin Wang: "4 Bistatic Synthetic Aperture Radar Synchronization Processing ", Radar Technology, Jan. 1, 2010 (Jan. 1, 2010), pp. 273-296, XP055164519, DOI: 10.5772/7184, ISBN: 978-9-53-307029-2, Retrieved from the Internet: URL: http://cdn.intechopen.com/pdfs-wm/6893.pdf [retrieved on Jan. 23, 2015].

Weiss M: "Synchronisation of bistatic radar systems", Geoscience and Remote Sensing Symposium, 2004. IGARSS, '04. Proceedings . 2004 IEEE International Anchorage, AK, USA Sep. 20-24, 2004, Piscataway, NJ, USA, IEEE, vol. 3, Sep. 20, 2004 (Sep. 20, 2004), pp. 1750-1753, XP010751951, DOI: 10.1109/IGARSS.2004.1370671 ISBN: 978-0/7803-8742-3.

Krieger Gerhard et al: " TanDEM-X: A radar interferometer with two formation-flying satellites", ACTA Astronautica, Pergamon Press, Elmsford, GB, vol. 89, Apr. 6, 2013 (Apr. 6, 2013), pp. 83-98, XP028562200, ISSN: 0094-5765, DOI: 10.1016/J.ACTAASTRO. 2013.03.008.

M. Younis et al: "Performance Prediction of a Phase Synchronization link for Bistatic SAR", IEEE Geoscience and Remote Sensing Letters, vol. 3, No. 3, Jul. 1, 2006 (Jul. 1, 2006), pp. 429-433, XP055506230, US ISSN: 1545-598X, DOI: 10 .1109/LGRS.2006. 874163.

Supplementary European Search Report in European application No. 18169769.9, dated Sep. 24, 2018.

* cited by examiner

METHOD AND DEVICE FOR NON-INTERRUPTED PHASE SYNCHRONIZATION SCHEME FOR BISTATIC SYNTHETIC APERTURE RADAR

CROSS-REFERENCE TO RELATED APPLICATIONS

The present application claims the benefit of Chinese Application No. 201710287459.8, filed on Apr. 27, 2017, the contents of which are hereby incorporated by reference in its entirety.

BACKGROUND

A Synthetic Aperture Radar (SAR) is a microwave imaging radar, and it may be mounted on a flying platform such as an aircraft, a satellite and a spacecraft to implement all-time all-weather observation on the ground, and has a certain ground penetration capability. Therefore, an SAR system has unique advantages in applications to aspects of disaster monitoring, resource exploration, marine monitoring, environmental monitoring, general investigation and yield estimation of crops, surveying and mapping, military reconnaissance and the like, may realize functions difficult for other remote sensing means to realize, and is applied to the fields of civil applications and national defense more and more.

A Bi-satellite formation SAR system is an important new-concept space-based radar system, and the system carries radars on satellites flying in a formation to form a bistatic/multi-static radar system to complete tasks of wide-swath high-resolution imaging, ground elevation measurement, ocean current velocity measurement, ground moving target detection and the like. Bi-satellite formation interference is implemented in a manner that a primary satellite transmits a signal and the primary and secondary satellites simultaneously receive signals. Since the primary and secondary satellites use different crystal oscillators, an azimuth phase error introduced by a crystal oscillator frequency error may exist, and is accumulated along with time. On the other hand, transmitting and receiving phases are unrelated in noise, a low-frequency phase noise component may not be canceled like a single-station condition, and an echo domain phase error generated by phase asynchrony may influence imaging focusing and interferometric phase accuracy, so that phase synchronization is required.

In a present related technology, during phase synchronization, a radar signal is stopped to be sent after the radar signal is transmitted, a dedicated phase synchronization signal is transmitted further for subsequent phase synchronization, and a carrier frequency of the phase synchronization signal is different from a carrier frequency of the radar signal. Therefore, not only may normal work of a radar be interrupted to reduce working efficiency of the radar, but also complexity in system design may be increased because the carrier frequency of the phase synchronization signal is different from the carrier frequency of the radar signal. In addition, the carrier frequency is different from the carrier frequency of the radar signal, and then obtained synchronization data is required to be converted into a magnitude of a frequency of the radar according to a proportion for phase compensation, so that compensation accuracy is reduced.

SUMMARY

In order to solve the technical problem of a conventional art, embodiments of the disclosure may provide a phase synchronization method and equipment. A phase synchronization signal is sent by virtue of a time slot between radar signals continuously transmitted in two times, normal work of a radar may be prevented from being interrupted, and working efficiency of the radar may further be improved.

In order to achieve the purpose, the technical solutions of the embodiments of the disclosure are implemented as follows.

In a first aspect, the embodiments of the disclosure provide a phase synchronization method, which may include that:

pulse widths of first and second phase synchronization signals and starting time of transmission of the first and second phase synchronization signals are determined, herein the starting time may be located between two successive moments when radar signals are transmitted;

a first spaceborne SAR is controlled to transmit the first phase synchronization signal to a second spaceborne SAR according to the pulse width and starting time of the first phase synchronization signal;

the second spaceborne SAR is controlled, according to the pulse width and starting time of the second phase synchronization signal, to transmit the second phase synchronization signal to the first spaceborne SAR;

a compensation phase is determined according to a peak phase of the second phase synchronization signal received by the first spaceborne SAR and a peak phase of the first phase synchronization signal received by the second spaceborne SAR; and phase synchronization compensation is performed, according to the compensation phase, on the radar signals received by the first spaceborne SAR and the second spaceborne SAR.

In a second aspect, the embodiments of the disclosure provide phase synchronization equipment, which may include: a processor and a storage medium arranged to store an executable instruction, herein the processor may be arranged to execute the stored executable instruction, the executable instruction including:

determining pulse widths of first and second phase synchronization signals and starting time of transmission of the first and second phase synchronization signals, herein the starting time may be located between two successive moments when radar signals are transmitted;

controlling a first spaceborne SAR to transmit the first phase synchronization signal to a second spaceborne SAR according to the pulse width and starting time of the first phase synchronization signal;

controlling the second spaceborne SAR to transmit the second phase synchronization signal to the first spaceborne SAR according to the pulse width and starting time of the second phase synchronization signal;

determining a compensation phase according to a peak phase of the second phase synchronization signal received by the first spaceborne SAR and a peak phase of the first phase synchronization signal received by the second spaceborne SAR; and performing phase synchronization compensation on the radar signals received by the first spaceborne SAR and the second spaceborne SAR according to the compensation phase.

The embodiments of the disclosure provide the phase synchronization method and equipment, herein, at first, the pulse widths of the first and second phase synchronization signals and the starting time of transmission of the first and second phase synchronization signals are determined, herein the starting time is located between the moments when the radar signals are continuously transmitted in two times; then, the first spaceborne SAR is controlled to transmit the first phase synchronization signal to the second spaceborne SAR according to the pulse width and starting time of the first phase synchronization signal; the second spaceborne SAR is controlled, according to the pulse width and starting time of the second phase synchronization signal, to transmit the second phase synchronization signal to the first spaceborne SAR; next, the compensation phase is determined according to the peak phase of the second phase synchronization signal received by the first spaceborne SAR and the peak phase of the first phase synchronization signal received by the second spaceborne SAR; and finally, phase synchronization compensation is performed, according to the compensation phase, on the radar signals received by the first spaceborne SAR and the second spaceborne SAR. Therefore, normal work of the radars may be prevented from being interrupted, and working efficiency of the radars may further be improved.

DETAILED DESCRIPTION

In order to make the purpose, technical solutions and advantages of the embodiments of the disclosure clearer, the specific technical solutions of the disclosure will be further described below in combination with the drawings in the embodiments of the disclosure in detail. The following embodiments are adopted not to limit the scope of the disclosure but to describe the disclosure.

Embodiment 1

Figure 1:
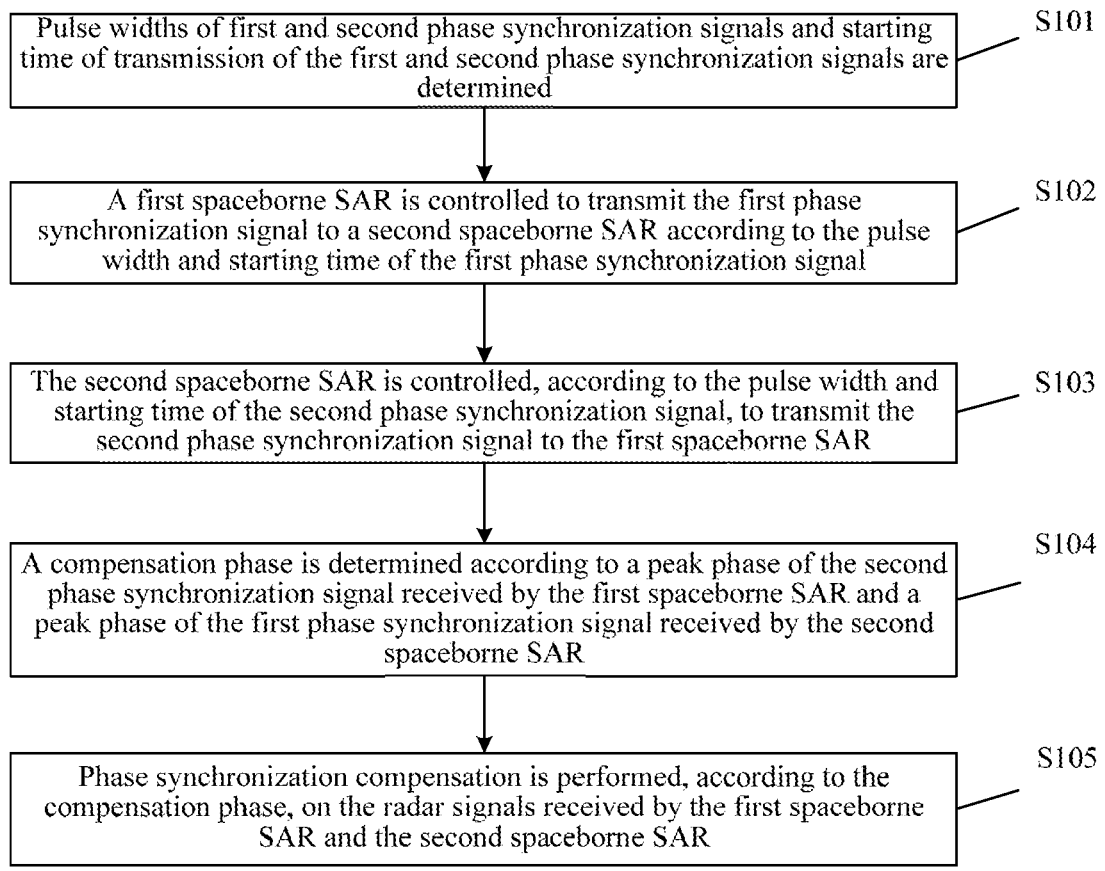
FIG. 1 is an implementation flowchart of a phase synchronization method according to an embodiment of the disclosure.

The embodiment of the disclosure provides a phase synchronization method, which is applied to a Bi-satellite SAR system, the Bi-satellite SAR system at least including a first spaceborne SAR and a second spaceborne SAR. FIG. 1 is an implementation flowchart of a phase synchronization method according to an embodiment of the disclosure. As shown in FIG. 1, the method includes the following steps.

In Step S101, pulse widths of first and second phase synchronization signals and starting time of transmission of the first and second phase synchronization signals are determined, herein the starting time of both the first phase synchronization signal and the second phase synchronization signal is located between two successive moments when radar signals are transmitted.

In the embodiment, the pulse widths are durations of pulses, and usually take a microsecond (μs) as a unit. If a distance between the first spaceborne SAR and the second spaceborne SAR is relatively longer, for strengthening strength of echo signals, relatively larger pulse widths are required to be adopted, and if the distance between the first spaceborne SAR and the second spaceborne SAR is relatively shorter, relatively smaller pulse widths may be adopted.

Since the starting time of both the first phase synchronization signal and the second phase synchronization signal is located between the moments when the radar signals are continuously transmitted in two times, for ensuring that both the first spaceborne SAR and the second spaceborne SAR may receive the phase synchronization signals transmitted by each other, the pulse widths of the phase synchronization signals are required to be determined according to Pulse Recurrence Time (PRT), a free duration in each piece of PRT and the distance between the first spaceborne SAR and the second spaceborne SAR.

In Step S102, the first spaceborne SAR is controlled to transmit the first phase synchronization signal to the second spaceborne SAR according to the pulse width and starting time of the first phase synchronization signal.

In the embodiment, the first phase synchronization signal is a linear frequency modulation signal, and a carrier frequency of the first phase synchronization signal is the same as carrier frequencies of the radar signals. In such a manner, during system design, settings of transceivers of the phase synchronization signals may be simplified, thereby reducing complexity in system design. Meanwhile, since the carrier frequency of the first phase synchronization signal is the same as the carrier frequencies of the radar signals, obtained synchronization data is not required to be converted into magnitudes of frequencies of the radars according to a proportion for phase compensation, so that a compensation result is more accurate.

In Step S103, the second spaceborne SAR is controlled, according to the pulse width and starting time of the second phase synchronization signal, to transmit the second phase synchronization signal to the first spaceborne SAR.

In the embodiment, like the first phase synchronization signal, the second phase synchronization signal is also a linear frequency modulation signal, and a carrier frequency of the second phase synchronization signal is also the same as the carrier frequencies of the radar signals.

In Step S104, a compensation phase is determined according to a peak phase of the second phase synchronization signal received by the first spaceborne SAR and a peak phase of the first phase synchronization signal received by the second spaceborne SAR.

In a process of implementing Step 104, the compensation phase may be obtained by performing subtraction on the peak phase of the first phase synchronization signal and the peak phase of the second phase synchronization to obtain a difference value and dividing the difference value by 2.

In Step S105, phase synchronization compensation is performed, according to the compensation phase, on the radar signals received by the first spaceborne SAR and the second spaceborne SAR.

In the embodiment, a Bi-satellite formation SAR system mainly has two working modes: the first is that only the first spaceborne SAR transmits a radar signal and the first spaceborne SAR and the second spaceborne SAR receives radar signals, and this working mode is called as a Bi-station mode; and the second is that the first spaceborne SAR and the second spaceborne SAR work independently, that is, the first spaceborne SAR and the second spaceborne SAR transmit signals and receive radar signals respectively, and this working mode is called as a catch-up one-station mode. In the Bi-station working mode, phase synchronization compensation is only required to be performed on the radar signal received by the satellite which transmits no radar signal; and in the catch-up one-station mode, phase synchronization compensation is required to be performed on the radar signals received by both the satellites.

In another embodiment of the disclosure, before Step S102, the method further includes that: carrier frequencies of the radar signals are acquired; and the first phase synchronization signal is determined according to the pulse width and starting time of the first phase synchronization signal and the carrier frequencies of the radar signals, herein the carrier frequency of the first phase synchronization signal is the same as the carrier frequencies of the radar signals. In the embodiment, after the pulse width, starting time and carrier frequency of the first phase synchronization signal, the first phase synchronization signal may be determined.

In another embodiment of the disclosure, before Step S103, the method further includes that: the second phase synchronization signal is determined according to the pulse width and starting time of the second phase synchronization signal and the carrier frequencies of the radar signals, herein a carrier frequency of the second phase synchronization signal is the same as the carrier frequencies of the radar signals.

In another embodiment of the disclosure, before Step S104, the method further includes that: the peak phase of the second phase synchronization signal received by the first spaceborne SAR is determined; and the peak phase of the first phase synchronization signal received by the second spaceborne SAR is determined. In an implementation process, pulse compensation may be performed on the received first phase synchronization signal and second phase synchronization signal respectively, and the peak phases are further extracted.

In the embodiment of the disclosure, at first, the pulse widths of the first and second phase synchronization signals and the starting time of transmission of the first and second phase synchronization signals are determined, herein the starting time is located between the moments when the radar signals are continuously transmitted in two times; then, the first spaceborne SAR is controlled to transmit the first phase synchronization signal to the second spaceborne SAR according to the pulse width and starting time of the first phase synchronization signal; the second spaceborne SAR is controlled, according to the pulse width and starting time of the second phase synchronization signal, to transmit the second phase synchronization signal to the first spaceborne SAR; next, the compensation phase is determined according to the peak phase of the second phase synchronization signal received by the first spaceborne SAR and the peak phase of the first phase synchronization signal received by the second spaceborne SAR; and finally, phase synchronization compensation is performed, according to the compensation phase, on the radar signals received by the first spaceborne SAR and the second spaceborne SAR. Therefore, normal work of the radars may be prevented from being interrupted, and working efficiency of the radars may further be improved.

Embodiment 2

Based on the abovementioned embodiment, the embodiment of the disclosure further provides a phase synchronization method, which is applied to a Bi-satellite SAR system, the Bi-satellite SAR system at least including a first spaceborne SAR and a second spaceborne SAR. The method includes the following steps.

In Step 1, pulse widths of first and second phase synchronization signals are determined.

In the embodiment, the pulse width of the first phase synchronization signal is the same as the pulse width of the second phase synchronization signal.

In Step 2, starting time of transmission of the first and second phase synchronization signals is determined.

Here, the starting time is located between two successive moments when radar signals are transmitted.

In Step 3, carrier frequencies of the radar signals are acquired.

Here, the carrier frequencies of the radar signals may be acquired from radar parameters.

In Step 4, the first phase synchronization signal is determined according to the pulse width and starting time of the first phase synchronization signal and the carrier frequencies of the radar signals.

Here, a carrier frequency of the first phase synchronization signal is the same as the carrier frequencies of the radar signals.

In Step 5, the first spaceborne SAR is controlled to transmit the first phase synchronization signal to the second spaceborne SAR.

In Step 6, the second phase synchronization signal is determined according to the pulse width and starting time of the second phase synchronization signal and the carrier frequencies of the radar signals.

Here, a carrier frequency of the second phase synchronization signal is the same as the carrier frequencies of the radar signals.

In Step 7, the second spaceborne SAR is controlled to transmit the second phase synchronization signal to the first spaceborne SAR.

In Step 8, a compensation phase is determined according to a peak phase of the second phase synchronization signal received by the first spaceborne SAR and a peak phase of the first phase synchronization signal received by the second spaceborne SAR.

In Step 9, phase synchronization compensation is performed, according to the compensation phase, on the radar signals received by the first spaceborne SAR and/or the second spaceborne SAR.

In another embodiment of the disclosure, Step 1 may be implemented by the following steps.

In Step 1a, a beam position data parameter of the Bi-satellite SAR system is acquired.

In Step 1b, first and second free durations in each of two adjacent PRTs are determined according to the beam position data parameter.

Here, the first free duration is a free duration between ending time of transmission of the radar signals and starting time of a radar echo sampling window in the PRT, and the second free duration is a free duration between ending time of the radar echo sampling window and starting time of next PRT.

In Step 1c, the pulse widths of the first phase synchronization signal and the second phase synchronization signal are determined according to the first free durations, the second free durations and a preset signal to noise ratio of the phase synchronization signals.

Here, in another embodiment of the disclosure, Step 1c may be implemented by the following steps: a maximum value in the first free duration and second free duration in the former PRT of the two adjacent PRTs is determined to be a first threshold value; a maximum value in the first free duration and second free duration in the latter PRT in the two adjacent PRTs is determined to be a second threshold value; a minimum value in the first threshold value and the second threshold value is determined to be a third threshold value; transmission durations of the first phase synchronization signal and the second phase synchronization signal are determined according to a distance between the first spaceborne SAR and the second spaceborne SAR; a maximum value of the pulse widths is determined according to the transmission durations of the first phase synchronization signal and the second phase synchronization signal; a minimum value of the pulse widths is determined according to the preset signal to noise ratio of the phase synchronization signals; and the pulse widths of the first phase synchronization signal and the second phase synchronization signal are determined according to the maximum value and minimum value of the pulse widths.

The pulse widths of the first phase synchronization signal and the second phase synchronization signal may be determined according to the maximum value and minimum value of the pulse widths in multiple implementation manners, for example: intermediate values of the minimum value and the maximum value may be determined to be the pulse widths, and a numerical value between the minimum value and the maximum value may also be randomly selected and determined to be the pulse width. Of course, prompting information may further be generated to prompt a user to input a numerical value between the minimum value and the maximum value, and the numerical value, input by a worker, between the minimum and maximum value is determined to be the pulse width.

In the embodiment and another embodiment of the disclosure, an implementation process of determining the starting time of the first phase synchronization signal is similar to a determination process for the second phase synchronization signal. Here, the implementation process is described with determination for the first phase synchronization signal as an example.

In another embodiment of the disclosure, the operation that the starting time of transmission of the first phase synchronization signal is determined in Step 2 further includes the following steps.

In Step 2a, the beam position data parameter of the Bi-satellite SAR system is acquired.

In Step 2b, a first free duration and second free duration in PRT of transmission of the first phase synchronization signal are determined according to the beam position data parameter.

Here, the first free duration is a free duration between ending time of transmission of the radar signals and starting time of a radar echo sampling window in the PRT, and the second free duration is a free duration between ending time of the radar echo sampling window and starting time of next PRT.

In Step 2c, the starting time of transmission of the first phase synchronization signal is determined according to the first free duration and the second free duration.

In another embodiment of the disclosure, the operation that the starting time of transmission of the first phase synchronization signal is determined according to the first free duration and the second free duration further includes that: if the first free duration is larger than the second free duration, the ending time of transmission of the radar signals is determined to be the starting time of the first phase synchronization signal; and if the first free duration is smaller than the second free duration, the ending time of the radar echo sampling window is determined to be the starting time of the first phase synchronization signal.

It is important to note that explanations of the same steps or concepts in the other embodiment in the embodiment may refer to descriptions in the other embodiment.

In the phase synchronization method provided by the embodiment of the disclosure, at first, the pulse widths of the first and second phase synchronization signals and the starting time of transmission of the first and second phase synchronization signals are determined, herein the starting time is located between the moments when the radar signals are continuously transmitted in two times; then, the first spaceborne SAR is controlled to transmit the first phase synchronization signal to the second spaceborne SAR according to the pulse width and starting time of the first phase synchronization signal; the second spaceborne SAR is controlled, according to the pulse width and starting time of the second phase synchronization signal, to transmit the second phase synchronization signal to the first spaceborne SAR; next, the compensation phase is determined according to the peak phase of the second phase synchronization signal received by the first spaceborne SAR and the peak phase of the first phase synchronization signal received by the second spaceborne SAR; and finally, phase synchronization compensation is performed, according to the compensation phase, on the radar signals received by the first spaceborne SAR and the second spaceborne SAR. In such a manner, the starting time of transmission of the first phase synchronization signal and the second phase synchronization signal is between the moments when the radar signals are continuously transmitted in two times, so that normal work of radars may be prevented from being interrupted, and working efficiency of the radars may further be improved; and moreover, the carrier frequencies of the phase synchronization signals are the same as the carrier frequencies of the radar signals, so that complexity in system design may be reduced, and compensation accuracy may also be improved.

Embodiment 3

Figure 2:
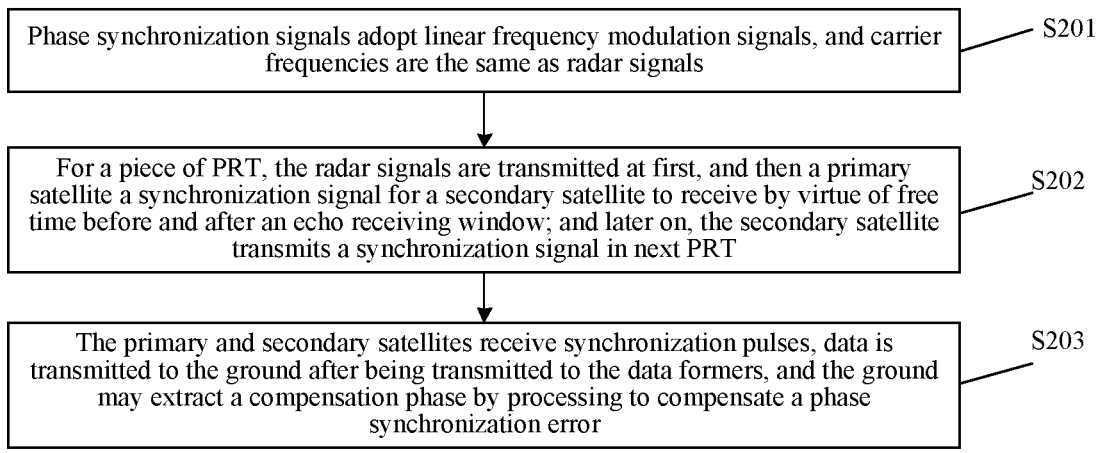
FIG. 2 is an implementation flowchart of another phase synchronization method according to an embodiment of the disclosure.

The embodiment of the disclosure provides a phase synchronization method at first, which is applied to a Bi-satellite SAR system, the Bi-satellite SAR system at least including a primary satellite and a secondary satellite, herein the primary satellite transmits a radar signal, and both the primary satellite and the secondary satellite receive radar signals. FIG. 2 is an implementation flowchart of another phase synchronization method according to an embodiment of the disclosure. As shown in FIG. 2, the method includes the following steps.

In Step S201, phase synchronization signals adopt linear frequency modulation signals, and carrier frequencies are the same as radar signals.

Figure 3:
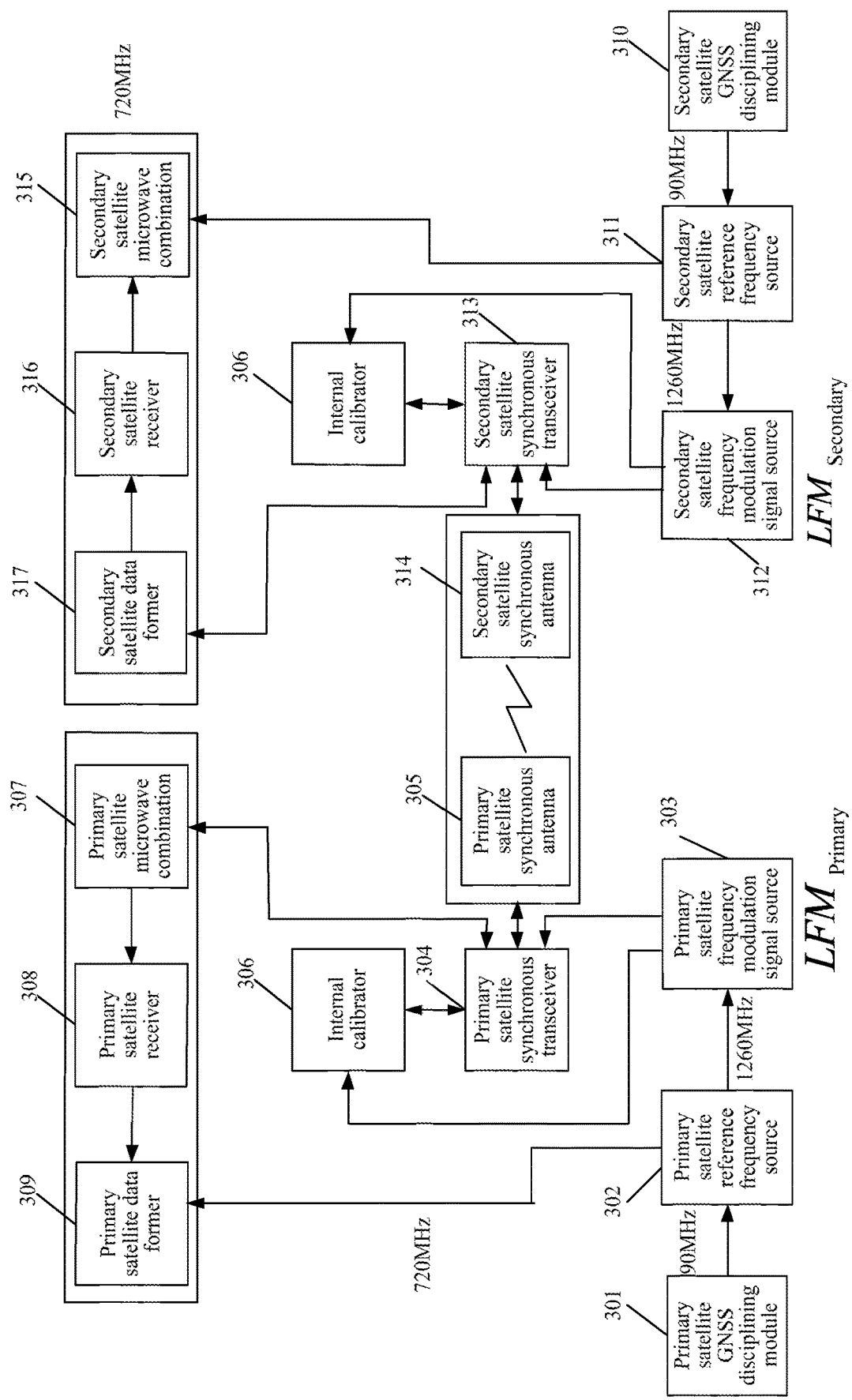
FIG. 3 is a structure diagram of a Bi-satellite SAR system according to an embodiment of the disclosure.

FIG. 3 is a structure diagram of a Bi-satellite SAR system according to an embodiment of the disclosure. As shown in FIG. 3, the system includes: a primary satellite Global Navigation Satellite System (GNSS) disciplining module 301, a primary satellite reference frequency source 302, a primary satellite frequency modulation signal source 303, a primary satellite synchronous transceiver 304, a primary satellite synchronous antenna 305, an internal calibrator 306, a primary satellite microwave combination 307, a primary satellite receiver 308, a primary satellite data former 309, a secondary satellite GNSS disciplining module 310, a secondary satellite reference frequency source 311, a secondary satellite frequency modulation signal source 312, a secondary satellite synchronous transceiver 313, a secondary satellite synchronous antenna 314, a secondary satellite microwave combination 315, a secondary satellite receiver 316 and a secondary satellite data former 317, herein the primary GNSS disciplining module 301 is arranged to provide a time frequency signal for a primary satellite reference frequency source module;

the primary satellite reference frequency source 302 is arranged to generate multiple working frequency signals for provision for the primary satellite frequency modulation signal source by taking a frequency provided by the primary satellite GNSS disciplining module as a reference;

the primary satellite frequency modulation signal source 303 is arranged to provide a linear frequency modulation signal for the primary satellite synchronous transceiver and the internal calibrator;

the primary satellite synchronous transceiver 304 is arranged to transmit or receive a phase synchronization signal to or from the secondary satellite through the primary satellite synchronous antenna;

the primary satellite synchronous antenna 305 is arranged to transmit or receive the phase synchronization signal to or from the secondary satellite;

the internal calibrator 306 is arranged to calibrate signals sent by the primary satellite or secondary satellite asynchronous transceiver;

the primary satellite microwave combination 307 is arranged to receive the phase synchronization signal transmitted by the primary satellite synchronous transceiver, and transmit a signal to the primary satellite synchronous transceiver;

the primary satellite receiver 308 is arranged to receive the signal sent by a primary satellite microwave combination, and send the signal to the primary satellite data former;

the primary satellite data former 309 is arranged to perform data processing on the received signal;

the secondary satellite GNSS disciplining module 310 is arranged to provide a time frequency signal for a secondary satellite reference frequency source module;

the secondary reference frequency source 311 is arranged to generate multiple working frequency signals for provision for the secondary satellite frequency modulation signal source by taking a frequency provided by the secondary satellite GNSS disciplining module as a reference;

the secondary satellite frequency modulation signal source 312 is arranged to provide a linear frequency modulation signal for the secondary satellite synchronous transceiver and the internal calibrator;

the secondary satellite synchronous transceiver 313 is arranged to transmit or receive a phase synchronization signal to or from the primary satellite through the secondary satellite synchronous antenna;

the secondary satellite synchronous antenna 314 is arranged to transmit or receive the phase synchronization signal to or from the primary satellite;

the secondary satellite microwave combination 315 is arranged to receive the phase synchronization signal transmitted by the secondary satellite synchronous transceiver, and transmit a signal to the secondary satellite synchronous transceiver;

the secondary satellite receiver 316 is arranged to receive the signal sent by a secondary satellite microwave combination, and send the signal to the secondary satellite data former; and the secondary satellite data former 317 is arranged to perform data processing on the received signal.

As shown in FIG. 3, both the primary satellite and secondary satellite reference frequency sources use a GNSS disciplining crystal oscillator, so that a radar frequency offset of the two satellites may be reduced as much as possible, sampling in a phase error data acquisition process meets a Nyquist theorem, complexity in phase synchronization error extraction and compensation may further be simplified, and phase synchronization reliability is improved.

In Step S202, for a piece of PRT, the radar signals are transmitted at first, and then the primary satellite a synchronization signal for the secondary satellite to receive by virtue of free time before and after an echo receiving window; and later on, the secondary satellite transmits a synchronization signal in next PRT.

Figure 4:
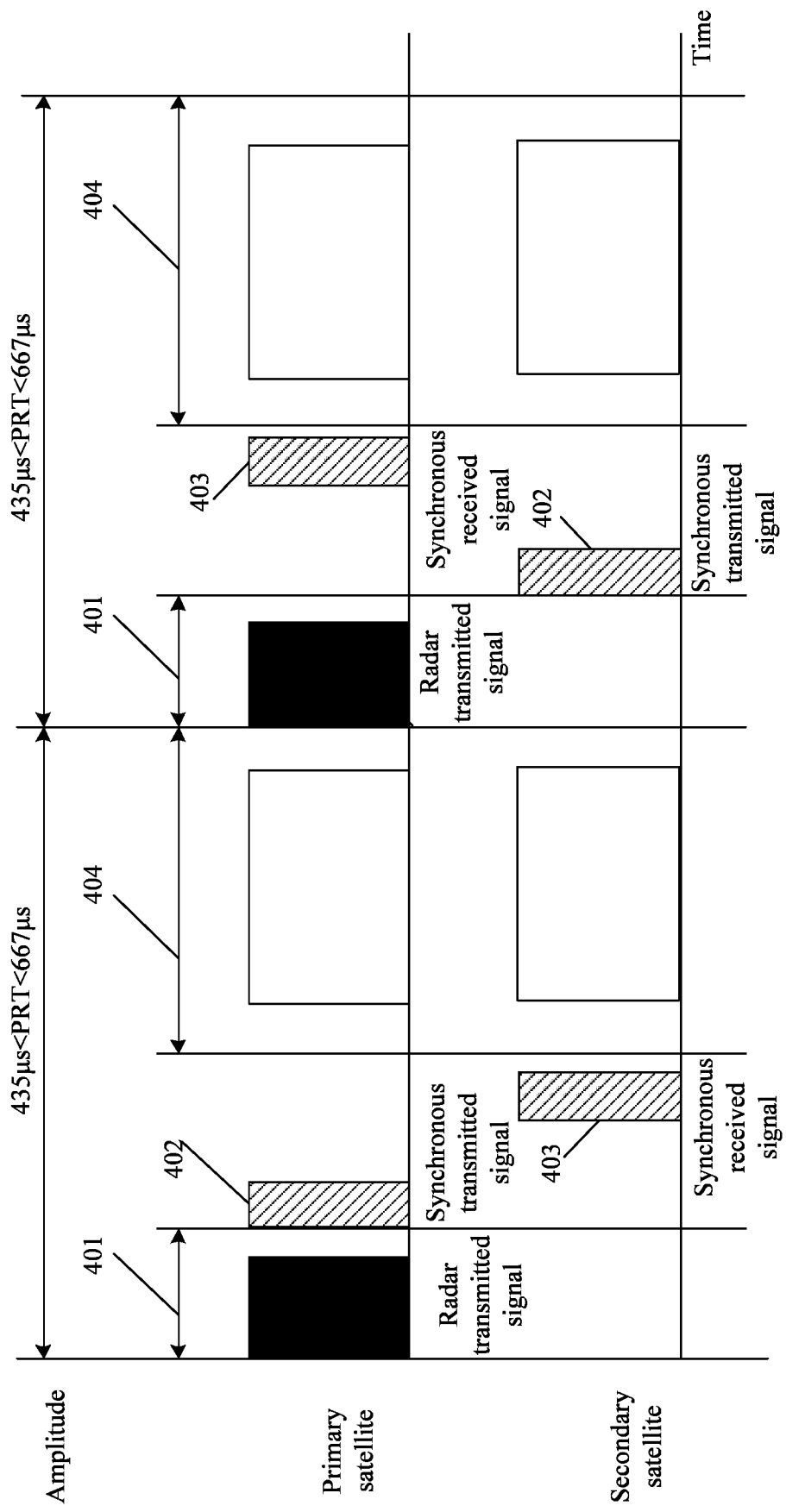
FIG. 4 is a diagram of a time sequence of receiving and transmitting signals by a primary satellite and a secondary satellite according to an embodiment of the disclosure.

Here, FIG. 4 is a diagram of a time sequence of receiving and transmitting signals by a primary satellite and a secondary satellite according to an embodiment of the disclosure. As shown in FIG. 4, for a piece of PRT, the primary satellite transmits a radar signal at first in a radar signal transmission window 401, herein a duration of the radar signal transmission window is a sum of a pulse width of the radar signal and guard time; then the primary satellite transmits a phase synchronization signal 402 to the secondary satellite by virtue of free time before and after an echo receiving window 404, and then the secondary satellite receives a synchronization signal 403 of the primary satellite; and in next PRT, the secondary satellite transmits the synchronization signal 402 to the primary satellite by virtue of the same free time to implement mutual pulse transmission.

In another embodiment of the disclosure, another alternative manner of Step S202 may be as follows: in the PRT, the primary satellite transmits the radar signal at first, and then the secondary satellite transmits the synchronization signal for the primary satellite to receive by virtue of the free time before and after the echo receiving window; and later on, in the next PRT, the primary satellite transmits the synchronization signal for the secondary satellite to receive by virtue of the free time before and after the echo receiving window.

Figure 5:
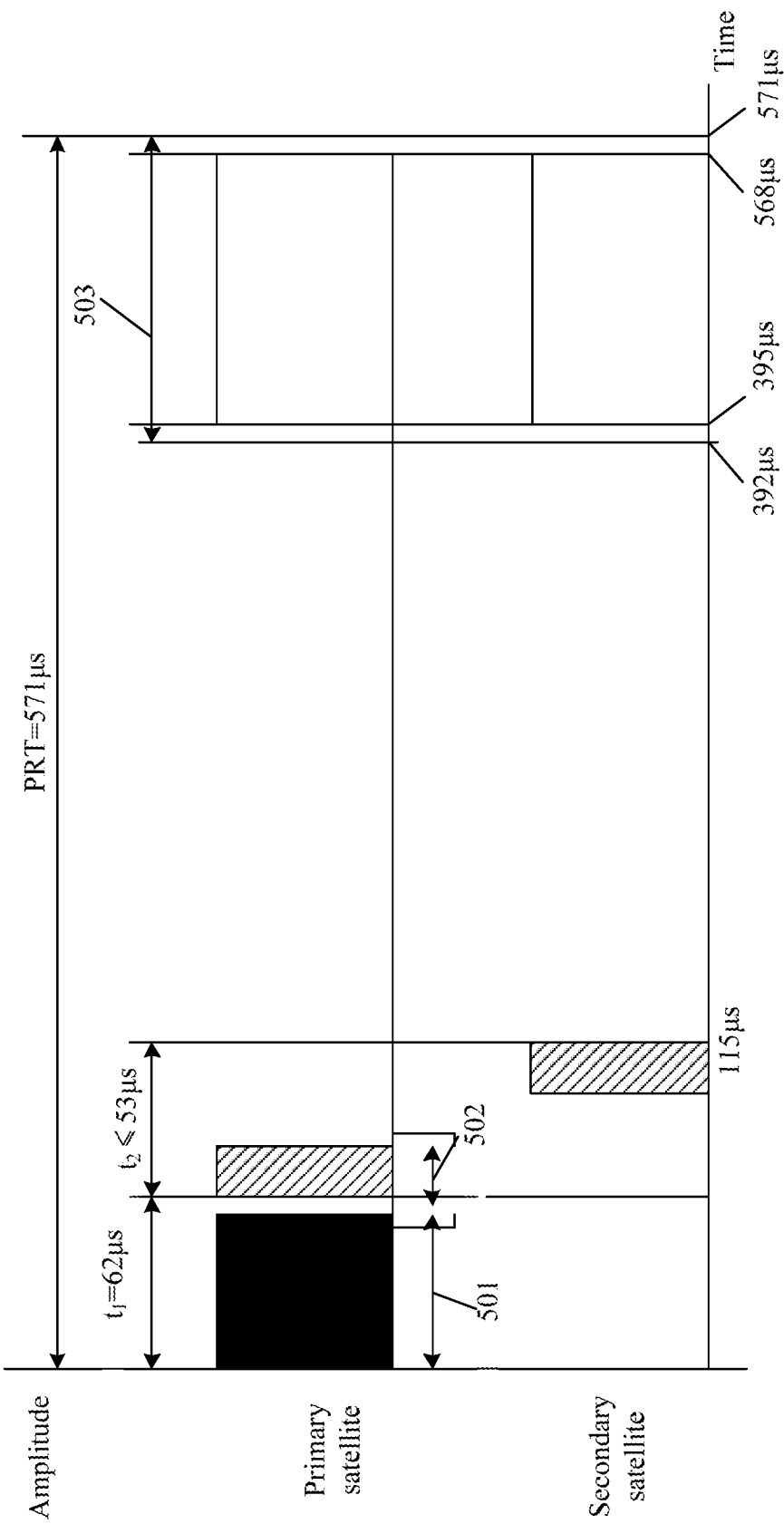
FIG. 5 is another diagram of a time sequence of receiving and transmitting signals by a primary satellite and a secondary satellite according to an embodiment of the disclosure.

FIG. 5 is another diagram of a time sequence of receiving and transmitting signals by a primary satellite and a secondary satellite according to an embodiment of the disclosure. As shown in FIG. 5, pulse widths 501 of SARs are 60 μs, guard time is 2 μs, a pulse width 502 of a synchronization signal is 20 μs, a maximum distance between the two satellites is 10 Km, transmission time is 33 μs, and an echo receiving window 503 is between 392 μs and 571 μs of PRT. Therefore, unidirectional transmission and reception of the phase synchronization signal may be implemented after a radar signal is transmitted and after an echo is received, and reverse pulse transmission and reception is implemented in next PRT.

In addition, for 10 beam positions, the free time before and after the radar echo sampling window in each piece of PRT is calculated. Table 1 is free time before and after a radar echo sampling window at an interference beam position. As shown in Table 1, free time longer than 53 μs exists in all of the 10 beam positions, and unidirectional transmission of a phase synchronization pulse may be performed at the free time before the radar echo sampling window or after the echo sampling window.

TABLE 1

| Beam position | 1 | 2 | 3 | 4 | 5 | 6 | 7 | 8 | 9 | 10 |
|---|---|---|---|---|---|---|---|---|---|---|
| Time before echo window (µS) | 160 | 143 | 89 | 81 | | 71 | 100 | 72 | 90 | 105 | 20 |
| Time after echo window (µS) | 173 | 185 | 247 | 66 | 122 | 157 | 33 | 63 | 106 | 219 |

In Step S203, after the primary and secondary satellites receive synchronization pulses, data is transmitted to the ground after being transmitted to the data formers, and the ground may extract a compensation phase by processing to compensate a phase synchronization error.

Figure 6:
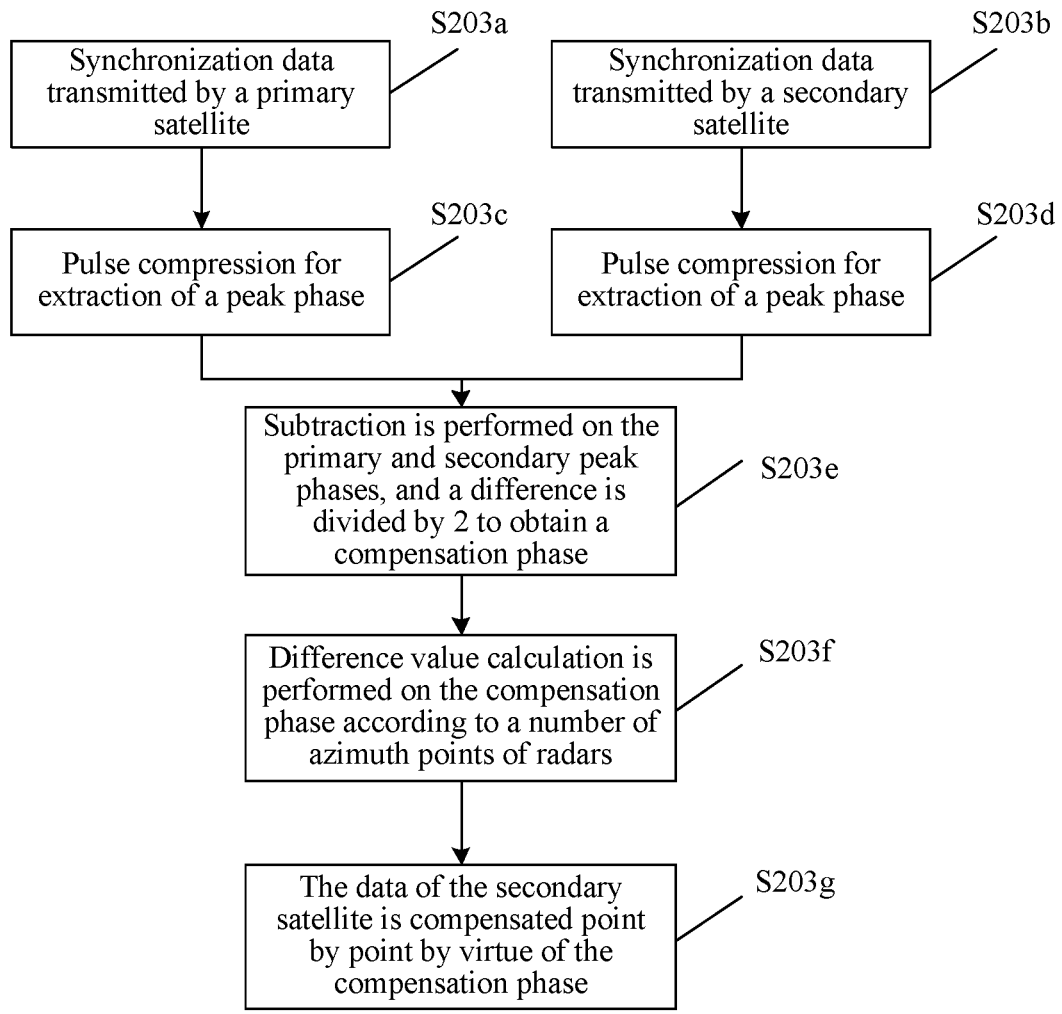
FIG. 6 is an implementation flowchart of phase synchronization compensation according to an embodiment of the disclosure.

Here, FIG. 6 is an implementation flowchart of phase synchronization compensation according to an embodiment of the disclosure. As shown in FIG. 6, phase synchronization compensation may be implemented by the following steps.

In Step S203a, synchronization data transmitted by the primary satellite is received.

In Step S203b, synchronization data transmitted by the secondary satellite is received.

In Step S203c, pulse compression is performed on the synchronization data transmitted by the primary satellite, and a peak phase is extracted.

In Step S203d, pulse compression is performed on the synchronization data transmitted by the secondary satellite, and a peak phase is extracted.

In Step S203e, subtraction is performed on the peak phases of the primary and secondary satellites, and a difference is divided by 2 to obtain the compensation phase.

In Step S203f, difference value calculation is performed on the compensation phase according to numbers of azimuth points of radars.

In Step S203g, the data of the secondary satellite is compensated point by point by virtue of the compensation phase.

It is important to note that there is no sequence for Step S203a and Step S203b, that is, execution sequences of Step S203a and Step S203b may be exchanged, or Step S203a and Step S203b may be executed at the same time; and there is no sequence for Step S203c and Step S203d, that is, execution sequences of Step S203c and Step S203d may be exchanged, or Step S203c and Step S203d may be executed at the same time.

It is important to note that the primary satellite and secondary satellite in the embodiment of the disclosure are a first spaceborne SAR and second spaceborne SAR in the other embodiments of the disclosure, but they do not correspond one to one. For example, the first spaceborne SAR may be the primary satellite, and may also be the secondary satellite, and if the first spaceborne SAR is the primary satellite, the second spaceborne SAR is the secondary satellite; and similarly, if the first spaceborne SAR is the secondary satellite, the second spaceborne SAR is the primary satellite.

In the embodiment of the disclosure, the phase synchronization signals adopt linear frequency modulation signals, and the carrier frequencies are the same as the radar signals; a time-sharing transmission manner is adopted for the radar signals and the synchronization signals, and for a piece of PRT, the radar signals are transmitted at first, and then the primary satellite transmits the synchronization signal for the secondary satellite to receive by virtue of the free time before and after the echo receiving window; and later on, in the next PRT, the secondary satellite transmits the synchronization signal for the primary satellite to receive, to implement alternate mutual transmission of the phase synchronization pulses. The carrier frequencies of the phase synchronization signals are the same as the radar signals, so that influence of signal transmission of the radars on the synchronization signals may be avoided; and the phase synchronization signals are transmitted and received by virtue of the free time before and after the echo receiving window, so that normal work of the radars may be prevented from being interrupted, and working efficiency of the radars may be improved.

Embodiment 4

Figure 7:
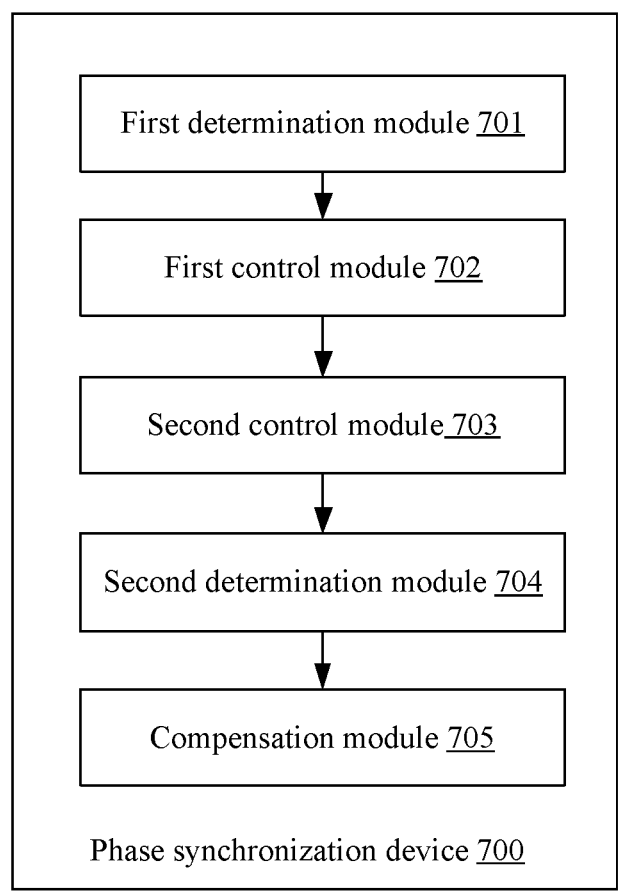
FIG. 7 is a structure diagram of a phase synchronization device according to an embodiment of the disclosure.

The embodiment of the disclosure provides a phase synchronization device. FIG. 7 is a structure diagram of a phase synchronization device according to an embodiment of the disclosure. As shown in FIG. 7, the device 700 includes: a first determination module 701, a first control module 702, a second control module 703, a second determination module 704 and a compensation module 705, herein the first determination module 701 is arranged to determine pulse widths of first and second phase synchronization signals and starting time of transmission of the first and second phase synchronization signals.

Here, the starting time is located between two successive moments when radar signals are transmitted.

The first control module 702 is arranged to control a first spaceborne SAR to transmit the first phase synchronization signal to a second spaceborne SAR according to the pulse width and starting time of the first phase synchronization signal.

The second control module 703 is arranged to control the second spaceborne SAR to transmit the second phase synchronization signal to the first spaceborne SAR according to the pulse width and starting time of the second phase synchronization signal.

The second determination module 704 is arranged to determine a compensation phase according to a peak phase of the second phase synchronization signal received by the first spaceborne SAR and a peak phase of the first phase synchronization signal received by the second spaceborne SAR.

The compensation module 705 is arranged to perform phase synchronization compensation on the radar signals received by the first spaceborne SAR and the second spaceborne SAR according to the compensation phase.

In another embodiment of the disclosure, the device further includes:

a first acquisition module arranged to acquire carrier frequencies of the radar signals;

a third determination module arranged to determine the first phase synchronization signal according to the pulse width and starting time of the first phase synchronization signal and the carrier frequencies of the radar signals, herein a carrier frequency of the first phase synchronization signal is the same as the carrier frequencies of the radar signals; and a fourth determination module arranged to determine the second phase synchronization signal according to the pulse width and starting time of the second phase synchronization signal and the carrier frequencies of the radar signals, herein a carrier frequency of the second phase synchronization signal is the same as the carrier frequencies of the radar signals.

In another embodiment of the disclosure, the first determination module 701 further includes:

a first acquisition unit arranged to acquire a beam position data parameter of a Bi-satellite SAR system;

a first determination unit arranged to determine first and second free durations in each of two adjacent PRTs according to the beam position data parameter, herein the first free duration is a free duration between ending time of transmission of the radar signals and starting time of a radar echo sampling window in the PRT, and the second free duration is a free duration between ending time of the radar echo sampling window and starting time of next PRT; and a second determination unit arranged to determine the pulse widths of the first phase synchronization signal and the second phase synchronization signal according to the first free durations, the second free durations and a preset signal to noise ratio of the phase synchronization signals.

Here, the second determination unit, in another embodiment of the disclosure, is further arranged to: determine a maximum value in the first free duration and second free duration in the former PRT of the two adjacent PRTs to be a first threshold value; determine a maximum value in the first free duration and second free duration in the latter PRT in the two adjacent PRTs to be a second threshold value; determine a minimum value in the first threshold value and the second threshold value to be a third threshold value; determine transmission durations of the first phase synchronization signal and the second phase synchronization signal according to a distance between the first spaceborne SAR and the second spaceborne SAR; determine a maximum value of the pulse widths according to the transmission durations of the first phase synchronization signal and the second phase synchronization signal; determine a minimum value of the pulse widths according to the preset signal to noise ratio of the phase synchronization signals; and determine the pulse widths of the first phase synchronization signal and the second phase synchronization signal according to the maximum value and minimum value of the pulse widths, herein the pulse width of the first phase synchronization signal is the same as the pulse width of the second phase synchronization signal.

A third determination unit is arranged to determine a first free duration and second free duration in PRT of transmission of the first phase synchronization signal according to the beam position data parameter, herein the first free duration is a free duration between ending time of transmission of the radar signals and starting time of a radar echo sampling window in the PRT, and the second free duration is a free duration between ending time of the radar echo sampling window and starting time of next PRT.

A fourth determination unit is arranged to determine the starting time of transmission of the first phase synchronization signal according to the first free duration and the second free duration.

Here, the fourth determination unit is further arranged to: if the first free duration is larger than the second free duration, determine the ending time of transmission of the radar signals to be the starting time of the first phase synchronization signal; and if the first free duration is smaller than the second free duration, determine the ending time of the radar echo sampling window to be the starting time of the first phase synchronization signal.

It is important to point out here that: similar to the descriptions about the method embodiment, the above descriptions about the phase synchronization device embodiment have beneficial effects similar to the method embodiment, which will thus not be elaborated. Technical details not disclosed in the phase synchronization device embodiment of the disclosure are understood with reference to the descriptions of the method embodiment of the disclosure.

Embodiment 5

Figure 8:
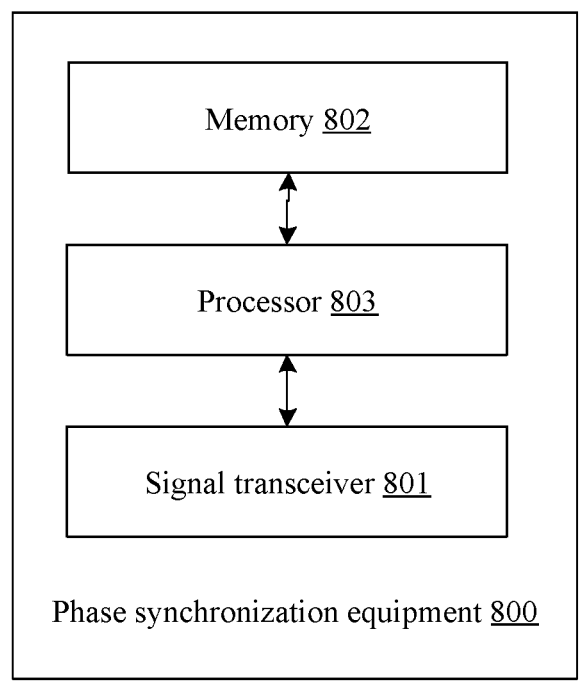
FIG. 8 is a structure diagram of phase synchronization equipment according to an embodiment of the disclosure.

The embodiment of the disclosure provides phase synchronization equipment. FIG. 8 is a structure diagram of phase synchronization equipment according to an embodiment of the disclosure. As shown in FIG. 8, the phase synchronization equipment 800 includes: a signal transceiver 801, a processor 803 and a memory 802, herein the signal transceiver 801 is arranged to receive and transmit a phase synchronization signal;

the memory 802 is arranged to store an executable instruction; and the processor 803 is arranged to execute the stored executable instruction, the executable instruction including:

determining pulse widths of first and second phase synchronization signals and starting time of transmission of the first and second phase synchronization signals, herein the starting time is located between two successive moments when radar signals are transmitted;

controlling a first spaceborne SAR to transmit the first phase synchronization signal to a second spaceborne SAR according to the pulse width and starting time of the first phase synchronization signal;

controlling the second spaceborne SAR to transmit the second phase synchronization signal to the first spaceborne SAR according to the pulse width and starting time of the second phase synchronization signal;

determining a compensation phase according to a peak phase of the second phase synchronization signal received by the first spaceborne SAR and a peak phase of the first phase synchronization signal received by the second spaceborne SAR; and performing phase synchronization compensation on the radar signals received by the first spaceborne SAR and the second spaceborne SAR according to the compensation phase.

In another embodiment of the disclosure, the processor is arranged to execute the stored executable instruction, the executable instruction further including:

acquiring a beam position data parameter of a Bi-satellite SAR system;

determining first and second free durations in each of two adjacent PRTs according to the beam position data parameter, herein the first free duration is a free duration between ending time of transmission of the radar signals and starting time of a radar echo sampling window in the PRT, and the second free duration is a free duration between ending time of the radar echo sampling window and starting time of next PRT; and determining the pulse widths of the first phase synchronization signal and the second phase synchronization signal according to the first free durations, the second free durations and a preset signal to noise ratio of the phase synchronization signals.

In another embodiment of the disclosure, the processor is arranged to execute the stored executable instruction, the executable instruction further including:

determining a maximum value in the first free duration and second free duration in the former PRT of the two adjacent PRTs to be a first threshold value;

determining a maximum value in the first free duration and second free duration in the latter PRT in the two adjacent PRTs to be a second threshold value;

determining a minimum value in the first threshold value and the second threshold value to be a third threshold value;

determining transmission durations of the first phase synchronization signal and the second phase synchronization signal according to a distance between the first spaceborne SAR and the second spaceborne SAR;

determining a maximum value of the pulse widths according to the transmission durations of the first phase synchronization signal and the second phase synchronization signal;

determining a minimum value of the pulse widths according to the preset signal to noise ratio of the phase synchronization signals; and determining the pulse widths of the first phase synchronization signal and the second phase synchronization signal according to the maximum value and minimum value of the pulse widths, herein the pulse width of the first phase synchronization signal is the same as the pulse width of the second phase synchronization signal.

In another embodiment of the disclosure, the processor is arranged to execute the stored executable instruction, the executable instruction further including:

acquiring the beam position data parameter of the Bi-satellite SAR system;

determining a first free duration and second free duration in PRT of transmission of the first phase synchronization signal according to the beam position data parameter, herein the first free duration is a free duration between ending time of transmission of the radar signals and starting time of a radar echo sampling window in the PRT, and the second free duration is a free duration between ending time of the radar echo sampling window and starting time of next PRT; and determining the starting time of transmission of the first phase synchronization signal according to the first free duration and the second free duration.

In another embodiment of the disclosure, the processor is arranged to execute the stored executable instruction, the executable instruction further including:

if the first free duration is larger than the second free duration, determining the ending time of transmission of the radar signals to be the starting time of the first phase synchronization signal; and if the first free duration is smaller than the second free duration, determining the ending time of the radar echo sampling window to be the starting time of the first phase synchronization signal.

In another embodiment of the disclosure, the processor is arranged to execute the stored executable instruction, the executable instruction further including:

acquiring carrier frequencies of the radar signals;

determining the first phase synchronization signal according to the pulse width and starting time of the first phase synchronization signal and the carrier frequencies of the radar signals, herein the carrier frequency of the first phase synchronization signal is the same as the carrier frequencies of the radar signals; and determining the second phase synchronization signal according to the pulse width and starting time of the second phase synchronization signal and the carrier frequencies of the radar signals, herein the carrier frequency of the second phase synchronization signal is the same as the carrier frequencies of the radar signals.

It is important to point out here that: similar to the descriptions about the method embodiment, the above descriptions about the phase synchronization equipment embodiment have beneficial effects similar to the method embodiment, which will thus not be elaborated. Technical details not disclosed in the phase synchronization equipment embodiment of the disclosure are understood with reference to the descriptions of the method embodiment of the disclosure.

Correspondingly, an embodiment of the disclosure provides a computer storage medium having stored thereon computer-executable instructions arranged to execute a phase synchronization method provided by another embodiment of the disclosure.

It should be understood that "one embodiment" or "an embodiment" mentioned in the whole specification means that specific characteristics, structures or properties related to the embodiment are included in at least one embodiment of the disclosure. Therefore, "in one embodiment" or "in an embodiment" appearing at each part of the whole specification does not always refer to the same embodiment. In addition, these specific characteristics, structures or properties may be combined in one or more embodiments in any proper manner. It should be understood that, in each embodiment of the disclosure, a magnitude of a sequence number of each process does not refer to an execution sequence, and the execution sequence of each process should be determined by its function and internal logic and not form any limit to an implementation process of the embodiment of the disclosure. Sequence numbers of the embodiments of the disclosure are only adopted for description, and do not represent quality of the embodiments.

It is important to note that, in the disclosure, terms "include", "contain" and any other variant is intended to cover nonexclusive inclusions, so that a process, method, object or device including a series of elements not only includes these elements, but also includes other elements which are not clearly listed, or further includes elements intrinsic to the process, the method, the object or the device. Under the circumstance that there are no more limits, an element limited by a statement "including a/an . . . " does not exclude that the same elements additionally exist in the process, method, object or device including the element.

In some embodiments provided by the disclosure, it should be understood that the disclosed equipment and method may be implemented in another manner. For example, the equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented by adopting a hardware form, and may also be implemented by adopting a form of combining hardware and a software function unit.

Those skilled in the art should know that: all or part of the steps implementing the method embodiment may be completed by instructing related hardware through a program, the program may be stored in a computer-readable storage medium, and when the program is executed, the steps of the method embodiment are executed; and the storage medium includes various media capable of storing program codes, such as mobile storage equipment, a Read-Only Memory (ROM), a magnetic disk or an optical disk.

Or, when being implemented in form of software function module and sold or used as an independent product, the integrated unit of the disclosure may also be stored in a computer-readable storage medium. Based on such an understanding, the technical solutions of embodiments of the disclosure substantially or parts making contributions to the conventional art may be embodied in form of software product, and the computer software product is stored in a storage medium, including a plurality of instructions arranged to enable a piece of computer equipment (which may be a personal computer, a server, network equipment or the like) to execute all or part of the steps of the method in each embodiment of the disclosure. The abovementioned storage medium includes: various media capable of storing program codes such as mobile storage equipment, a ROM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A phase synchronization method, comprising:
   determining pulse widths of first and second phase synchronization signals and starting times of transmission of the first and second phase synchronization signals, wherein a radar signal is transmitted in each Pulse Recurrence Time (PRT), and the starting time of transmission of each of the first and second phase synchronization signal is located between two successive moments when the radar signal is transmitted in two adjacent PRTs;
   controlling a first spaceborne Synthetic Aperture Radar (SAR) to transmit the first phase synchronization signal to a second spaceborne SAR according to the pulse width and starting time of the first phase synchronization signal;
   controlling the second spaceborne SAR to transmit the second phase synchronization signal to the first spaceborne SAR according to the pulse width and starting time of the second phase synchronization signal;
   determining a compensation phase according to a peak phase of the second phase synchronization signal received by the first spaceborne SAR and a peak phase of the first phase synchronization signal received by the second spaceborne SAR; and
   performing phase synchronization compensation on the radar signals received by the first spaceborne SAR and/or the second spaceborne SAR according to the compensation phase,
   wherein in a Bi-station mode of a Bi-satellite SAR system, the first spaceborne SAR or the second spaceborne SAR that is borne by a primary satellite transmits the radar signal, and both the first spaceborne SAR and the second spaceborne SAR receive the radar signal;
   and in a catch-up one-station mode of the Bi-satellite SAR system, the first spaceborne SAR and the second spaceborne SAR transmit and receive the radar signal independently from one another,
   characterized in that, determining the pulse widths of the first and second phase synchronization signals comprises:
   acquiring a beam position data parameter of the Bi-satellite SAR system;
   for each of the first spaceborne SAR and the second spaceborne SAR, determining first and second free durations in each of the two adjacent PRTs according to the beam position data parameter, wherein the first free duration is a free duration between an ending time of transmission of the radar signal and a starting time of a radar echo receiving window in the PRT, and the second free duration is a free duration between an ending time of the radar echo receiving window and a starting time of next PRT; and
   determining the pulse widths of the first phase synchronization signal and the second phase synchronization signal according to the first free durations, the second free durations and a preset signal to noise ratio of the phase synchronization signals.

2. The method according to claim 1, wherein determining the pulse widths of the first phase synchronization signal and the second phase synchronization signal according to the first free durations, the second free durations and the preset signal to noise ratio of the phase synchronization signals comprises:
   determining a maximum value in the first free duration and second free duration in the former PRT of the two adjacent PRTs to be a first threshold value;
   determining a maximum value in the first free duration and second free duration in the latter PRT in the two adjacent PRTs to be a second threshold value;
   determining a minimum value in the first threshold value and the second threshold value to be a third threshold value;
   determining transmission durations of the first phase synchronization signal and the second phase synchronization signal according to a distance between the first spaceborne SAR and the second spaceborne SAR;
   determining a maximum value of the pulse widths according to the transmission durations of the first phase synchronization signal and the second phase synchronization signal;
   determining a minimum value of the pulse widths according to the preset signal to noise ratio of the phase synchronization signals; and
   determining the pulse widths of the first phase synchronization signal and the second phase synchronization signal according to the maximum value and minimum value of the pulse widths, wherein the pulse width of the first phase synchronization signal is the same as the pulse width of the second phase synchronization signal, and wherein in a same PRT, the first free duration for the first spaceborne SAR is the same as the first free duration for the second spaceborne SAR, and the second free duration for the first spaceborne SAR is the same as the second free duration for the second spaceborne SAR.

3. The method according to claim 1, wherein determining the starting time of transmission of the first phase synchronization signal comprises:
   acquiring the beam position data parameter of the Bi-satellite SAR system;

determining, according to the beam position data parameter, the first free duration and the second free duration in the PRT where the first phase synchronization signal is transmitted; and determining the starting time of transmission of the first phase synchronization signal according to the first free duration and the second free duration in the PRT where the first phase synchronization signal is transmitted.

4. The method according to claim 3, wherein determining the starting time of transmission of the first phase synchronization signal according to the first free duration and the second free duration comprises:

when the first free duration is larger than the second free duration, determining the ending time of transmission of the radar signal to be the starting time of the first phase synchronization signal; and when the first free duration is smaller than the second free duration, determining the ending time of the radar echo receiving window to be the starting time of the first phase synchronization signal.

5. The method according to claim 1, further comprising: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

6. The method according to claim 2, further comprising: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

7. The method according to claim 3, further comprising: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

8. The method according to claim 4, further comprising: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

9. Phase synchronization equipment, comprising:

a signal transceiver, a processor and a memory, wherein the signal transceiver is arranged to receive and transmit a phase synchronization signal;

the memory is arranged to store executable instructions; and the processor is arranged to execute the stored executable instructions to perform a phase synchronization method, the method comprises:

determining pulse widths of first and second phase synchronization signals and starting times of transmission of the first and second phase synchronization signals, wherein a radar signal is transmitted in each Pulse Recurrence Time (PRT), and the starting time of transmission of each of the first and second phase synchronization signal is located between two successive moments when the radar signal is transmitted in two adjacent PRTs;

controlling a first spaceborne Synthetic Aperture Radar (SAR)to transmit the first phase synchronization signal to a second spaceborne SAR according to the pulse width and starting time of the first phase synchronization signal;

controlling the second spaceborne SAR to transmit the second phase synchronization signal to the first spaceborne SAR according to the pulse width and starting time of the second phase synchronization signal;

determining a compensation phase according to a peak phase of the second phase synchronization signal received by the first spaceborne SAR and a peak phase of the first phase synchronization signal received by the second spaceborne SAR; and performing phase synchronization compensation on the radar signals received by the first spaceborne SAR and the second spaceborne SAR according to the compensation phase, wherein in a Bi-station mode of a Bi-satellite SAR system, the first spaceborne SAR or the second spaceborne SAR that is borne by a primary satellite transmits the radar signal, and both the first spaceborne SAR and the second spaceborne SAR receive the radar signal;

and in a catch-up one-station mode of the Bi-satellite SAR system, the first spaceborne SAR and the second spaceborne SAR transmit and receive the radar signal independently from one another, characterized in that, determining the pulse widths of the first and second phase synchronization signals comprises:

acquiring a beam position data parameter of the Bi-satellite SAR system;

for each of the first spaceborne SAR and the second spaceborne SAR, determining first and second free durations in each of the two adjacent PRTs according to the beam position data parameter, wherein the first free duration is a free duration between an ending time of transmission of the radar signal and a starting time of a radar echo receiving window in the PRT, and the second free duration is a free duration between an ending time of the radar echo receiving window and a starting time of next PRT; and determining the pulse widths of the first phase synchronization signal and the second phase synchronization signal according to the first free durations, the second free durations and a preset signal to noise ratio of the phase synchronization signals.

10. The phase synchronization equipment according to claim 9, wherein determining the pulse widths of the first phase synchronization signal and the second phase synchronization signal according to the first free durations, the second free durations and the preset signal to noise ratio of the phase synchronization signals comprises:

determining a maximum value in the first free duration and second free duration in the former PRT of the two adjacent PRTs to be a first threshold value;

determining a maximum value in the first free duration and second free duration in the latter PRT in the two adjacent PRTs to be a second threshold value;

determining a minimum value in the first threshold value and the second threshold value to be a third threshold value;

determining transmission durations of the first phase synchronization signal and the second phase synchronization signal according to a distance between the first spaceborne SAR and the second spaceborne SAR;

determining a maximum value of the pulse widths according to the transmission durations of the first phase synchronization signal and the second phase synchronization signal;

determining a minimum value of the pulse widths according to the preset signal to noise ratio of the phase synchronization signals; and determining the pulse widths of the first phase synchronization signal and the second phase synchronization signal according to the maximum value and minimum value of the pulse widths, wherein the pulse width of the first phase synchronization signal is the same as the pulse width of the second phase synchronization signal, and wherein in a same PRT, the first free duration for the first spaceborne SAR is the same as the first free duration for the second spaceborne SAR, and the second free duration for the first spaceborne SAR is the same as the second free duration for the second spaceborne SAR.

11. The phase synchronization equipment according to claim 9, wherein determining the starting time of transmission of the first phase synchronization signal comprises:

acquiring the beam position data parameter of the Bi-satellite SAR system;

determining, according to the beam position data parameter, the first free duration and the second free duration in the PRT where the first phase synchronization signal is transmitted; and determining the starting time of transmission of the first phase synchronization signal according to the first free duration and the second free duration in the PRT where the first phase synchronization signal is transmitted.

12. The phase synchronization equipment according to claim 11, wherein determining the starting time of transmission of the first phase synchronization signal according to the first free duration and the second free duration comprises:

when the first free duration is larger than the second free duration, determining the ending time of transmission of the radar signal to be the starting time of the first phase synchronization signal; and when the first free duration is smaller than the second free duration, determining the ending time of the radar echo receiving window to be the starting time of the first phase synchronization signal.

13. The phase synchronization equipment according to claim 9, wherein the method further comprises: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

14. The phase synchronization equipment according to claim 10, wherein the method further comprises: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

15. The phase synchronization equipment according to claim 11, wherein the method further comprises: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

16. The phase synchronization equipment according to claim 12, wherein the method further comprises: before controlling the first spaceborne SAR to transmit the first phase synchronization signal to the second spaceborne SAR according to the pulse width and starting time of the first phase synchronization signal, acquiring a carrier frequency of the radar signal;

determining the first phase synchronization signal according to the pulse width and starting time of the first phase synchronization signal and the carrier frequency of the radar signal, wherein the carrier frequency of the first phase synchronization signal is the same as the carrier frequency of the radar signal; and determining the second phase synchronization signal according to the pulse width and starting time of the second phase synchronization signal and the carrier frequency of the radar signal, wherein the carrier frequency of the second phase synchronization signal is the same as the carrier frequency of the radar signal.

\* \* \* \* \*